United States Patent
Otaki

(10) Patent No.: US 12,051,278 B2
(45) Date of Patent: Jul. 30, 2024

(54) INFORMATION PROCESSING APPARATUS, SYSTEM, AND METHOD FOR DETERMINING A CANCELLATION FEE FOR AN ON-DEMAND BUS

(71) Applicant: TOYOTA JIDOSHA KABUSHIKI KAISHA, Toyota (JP)

(72) Inventor: Sho Otaki, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/964,238

(22) Filed: Oct. 12, 2022

(65) Prior Publication Data

US 2023/0114937 A1   Apr. 13, 2023

(30) Foreign Application Priority Data

Oct. 13, 2021   (JP) .................................. 2021-168385

(51) Int. Cl.
| | |
|---|---|
| *G06Q 50/47* | (2024.01) |
| *G06Q 10/02* | (2012.01) |
| *G06Q 30/0283* | (2023.01) |
| *G06Q 50/40* | (2024.01) |
| *G07B 15/02* | (2011.01) |

(52) U.S. Cl.
CPC ............. *G07B 15/02* (2013.01); *G06Q 10/02* (2013.01); *G06Q 30/0284* (2013.01); *G06Q 50/40* (2024.01)

(58) Field of Classification Search
CPC ......... G06Q 30/02; G06Q 10/02; G06Q 50/04
See application file for complete search history.

(56) References Cited

U.S. PATENT DOCUMENTS

| | | | |
|---|---|---|---|
| 2014/0156320 A1 | 6/2014 | Levin | |
| 2017/0169366 A1* | 6/2017 | Klein | .................. G06Q 10/025 |
| 2021/0166208 A1 | 6/2021 | Kaneichi | |
| 2021/0192951 A1* | 6/2021 | Ogura | ..................... E05F 15/70 |

FOREIGN PATENT DOCUMENTS

| | | |
|---|---|---|
| JP | 2021-086557 A | 6/2021 |
| JP | 2021-099585 A | 7/2021 |
| JP | 2021-099593 A | 7/2021 |

OTHER PUBLICATIONS

Pattnaik, Anubhav; "How does Uber do Surge Pricing using Location Data?"; Nov. 26, 2019; https://web.archive.org/web/20200616193221/https://medium.com/locale-ai/how-does-uber-do-price-surge-using-location-data-cfee03415022 (Year: 2019).*

* cited by examiner

*Primary Examiner* — Rupangini Singh
*Assistant Examiner* — David G. Godbold
(74) *Attorney, Agent, or Firm* — Dinsmore & Shohl LLP

(57) ABSTRACT

An information processing apparatus includes a controller. When a cancellation of a reservation for use of an on-demand bus occurs, the controller determines a cancellation fee to be charged to a user who makes the cancellation, based on timing of occurrence of the cancellation.

18 Claims, 4 Drawing Sheets

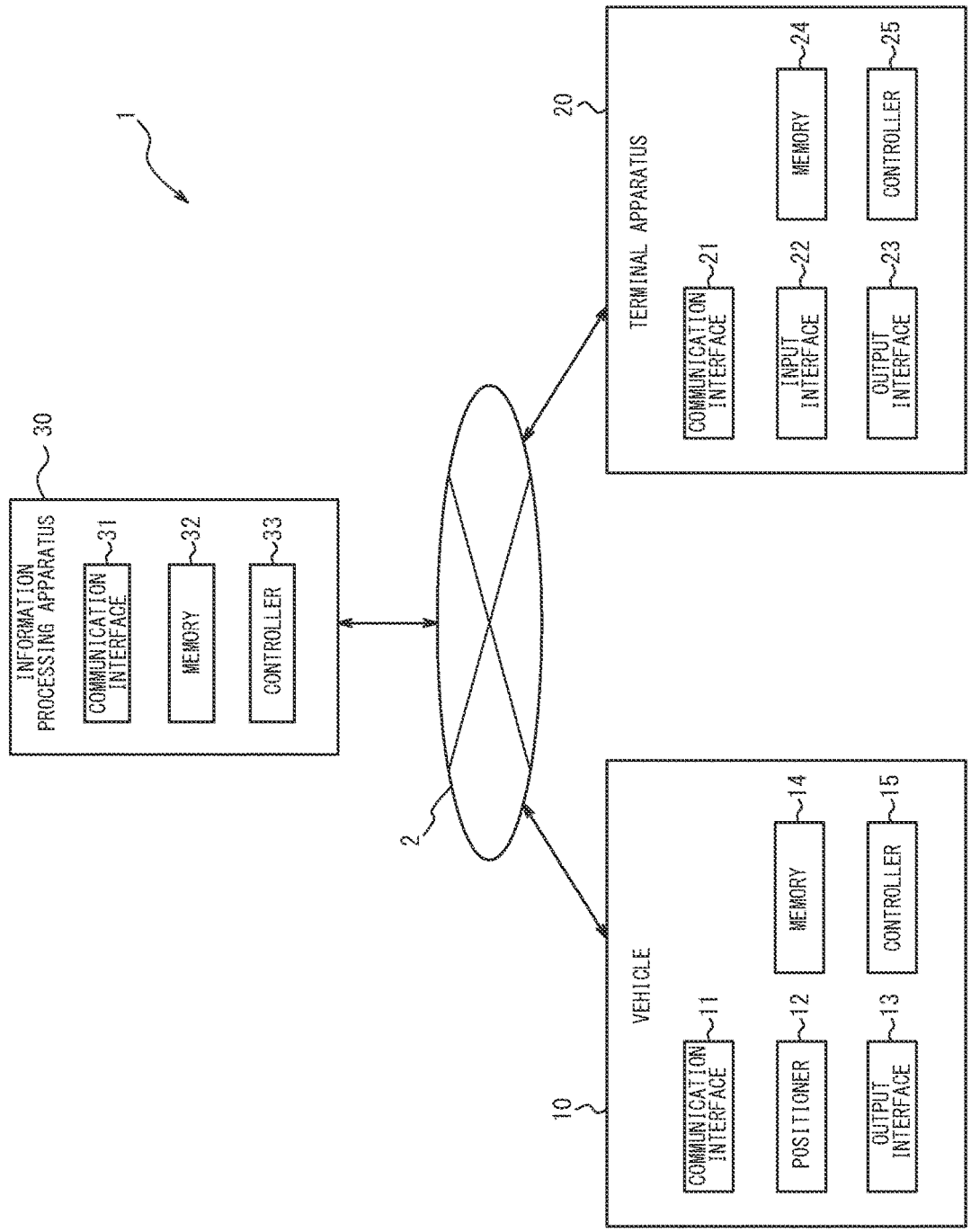

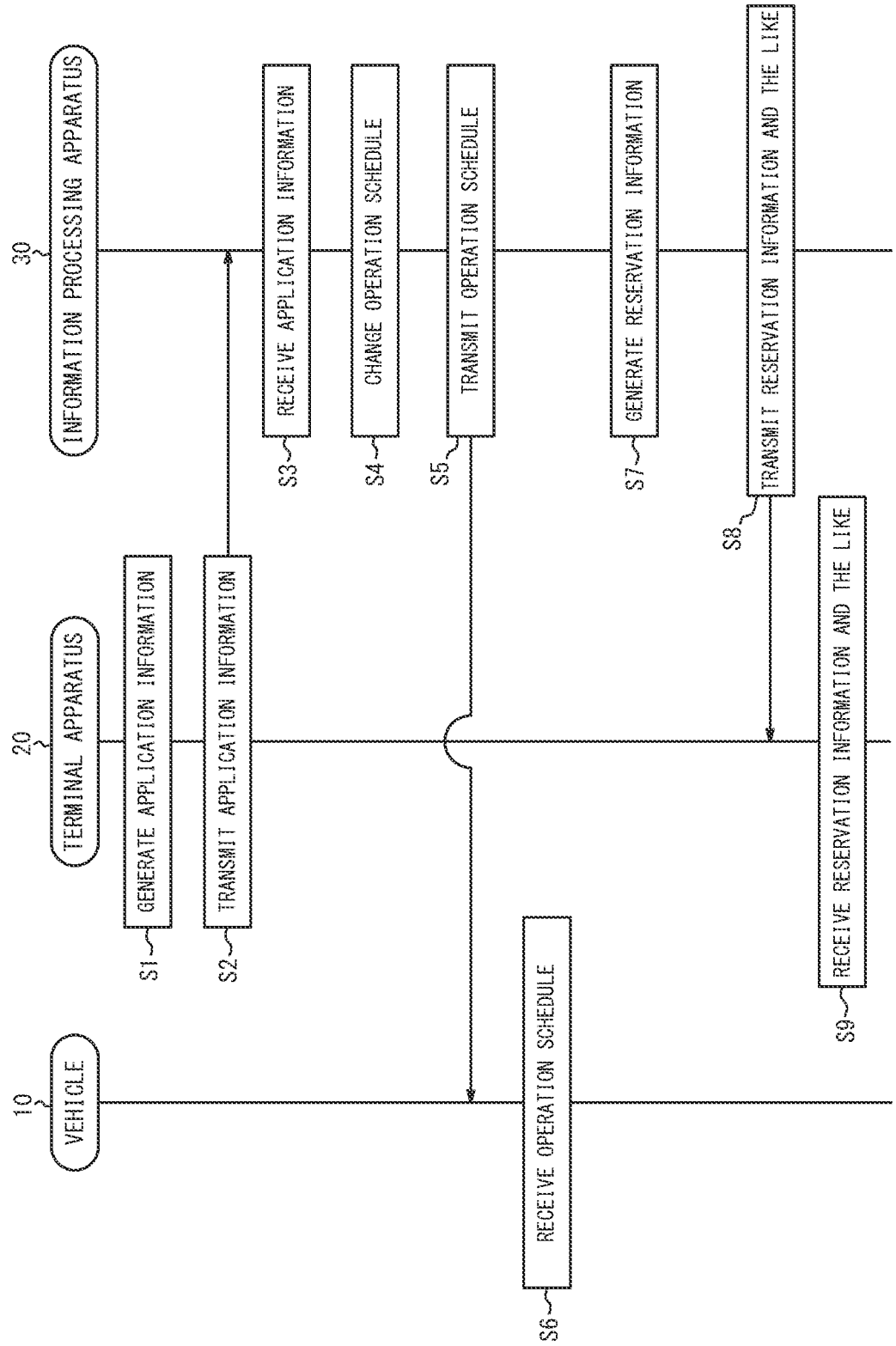

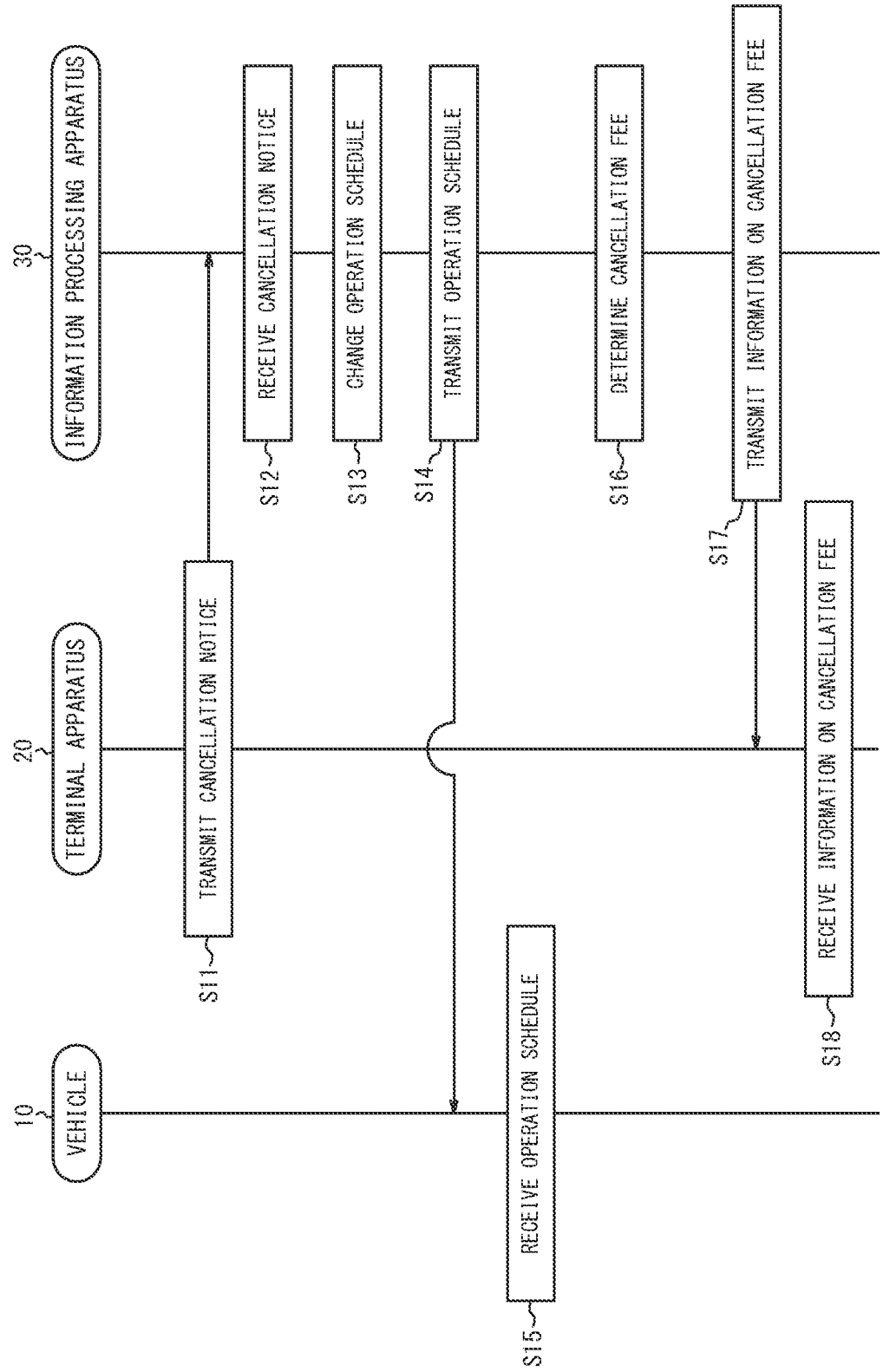

INFORMATION PROCESSING APPARATUS, SYSTEM, AND METHOD FOR DETERMINING A CANCELLATION FEE FOR AN ON-DEMAND BUS

CROSS-REFERENCE TO RELATED APPLICATION

This application claims priority to Japanese Patent Application No. 2021-168385 filed on Oct. 13, 2021, the entire contents of which are incorporated herein by reference.

TECHNICAL FIELD

The present disclosure relates to an information processing apparatus, an information processing system, and an information processing method.

BACKGROUND

Patent Literature (PTL) 1 discloses a control apparatus including a controller that assigns payment of a fare for a vehicle that collectively transports multiple users to each of the users.

CITATION LIST

Patent Literature

PTL 1: JP 2021-86557 A

SUMMARY

Technology for determining appropriate cancellation fees when reservations for use of on-demand buses are cancelled is desired.

It would be helpful to provide technology for determining appropriate cancellation fees.

An information processing apparatus according to an embodiment of the present disclosure includes a controller determining, when a cancellation of a reservation for use of an on-demand bus occurs, a cancellation fee to be charged to a user who makes the cancellation, based on timing of occurrence of the cancellation.

An information processing system according to an embodiment of the present disclosure includes:
  a terminal apparatus configured to transmit, to an information processing apparatus, application information indicating an application for a reservation for use of an on-demand bus; and
  the information processing apparatus configured to, upon receiving the application information, perform a reservation process for the on-demand bus,
  wherein when a cancellation of the reservation for use of the on-demand bus occurs, the information processing apparatus determines a cancellation fee to be charged to a user who makes the cancellation, based on timing of occurrence of the cancellation.

An information processing method according to an embodiment of the present disclosure includes, when a cancellation of a reservation for use of an on-demand bus occurs, determining a cancellation fee to be charged to a user who makes the cancellation, based on timing of occurrence of the cancellation.

According to an embodiment of the present disclosure, technology for determining appropriate cancellation fees can be provided.

BRIEF DESCRIPTION OF THE DRAWINGS

In the accompanying drawings:
FIG. 2 is a block diagram of the information processing system illustrated in FIG. 1;
FIG. 3 is a sequence diagram illustrating operations for a reservation process by the information processing system illustrated in FIG. 2;
and
FIG. 4 is a sequence diagram illustrating operations for a cancellation process by the information processing system illustrated in FIG. 2.

DETAILED DESCRIPTION

Figure 1:
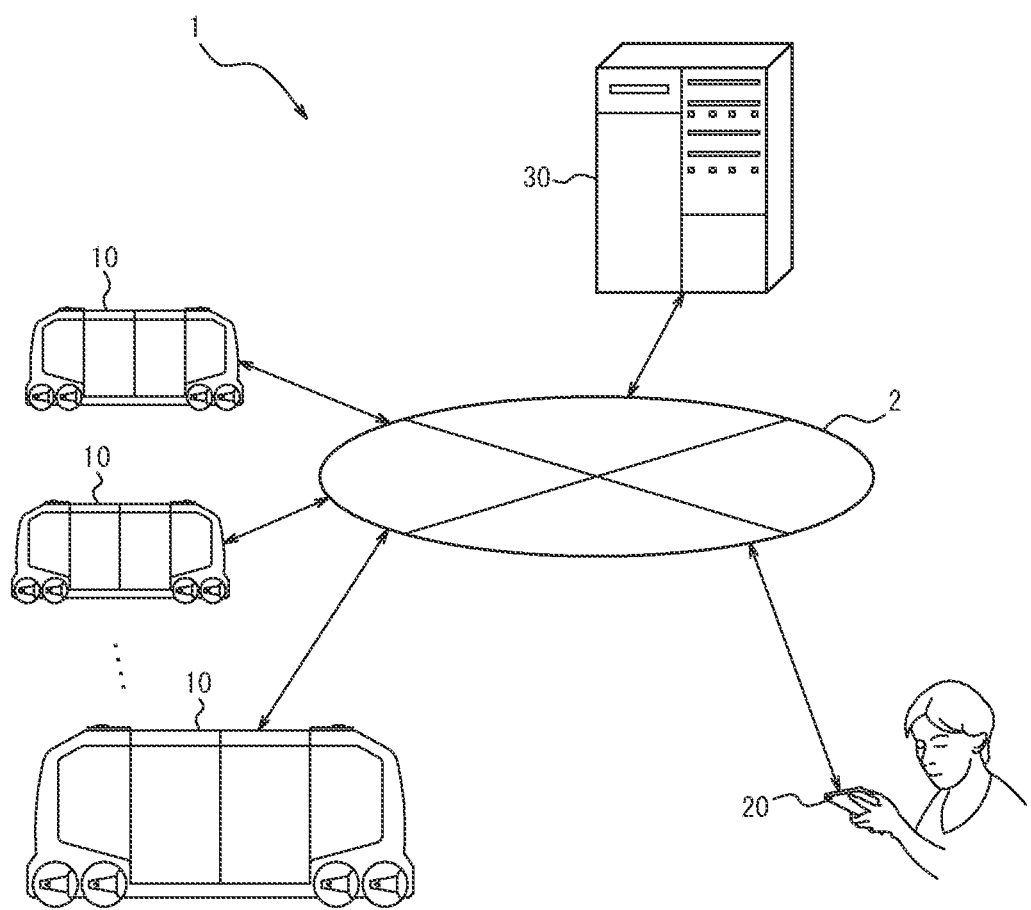
FIG. 1 is a diagram illustrating a schematic configuration of an information processing system according to an embodiment of the present disclosure.

An embodiment of the present disclosure will be described below, with reference to the drawings.

(Configuration of System)

As illustrated in FIG. 1, an information processing system 1 includes a plurality of vehicles 10, at least one terminal apparatus 20, and at least one information processing apparatus 30. The information processing system 1 illustrated in FIG. 1 includes the plurality of vehicles 10. However, the information processing system 1 only needs to include at least one vehicle 10.

The vehicles 10, the terminal apparatus 20, and the information processing apparatus 30 are communicable via a network 2. The network 2 may be any network including a mobile communication network, the Internet, or the like.

The vehicles 10 are operated as on-demand buses. The on-demand buses are buses that are operated on demand from users. The users reserve the on-demand buses before use.

The vehicles 10 travel, for example, a predetermined basic route. Each of the users gets on the vehicle 10, for example, at a pre-designated dispatch spot of the vehicle 10. The dispatch spot of the vehicle 10 may be on the basic route or not on the basic route. When the dispatch spot of the vehicle 10 is not on the basic route, the vehicle 10 deviates from the basic route to head for the dispatch spot toward a dispatch time.

At least some of the plurality of vehicles 10 may be operated as regular route buses traveling only on the basic route during a certain time period of the day, e.g., during a commute time period. The regular route buses are buses that are operated according to a predetermined timetable.

Each of the vehicles 10 may be any type of automobile. Each of the vehicles 10 is, for example, a gasoline automobile, a Battery Electric Vehicle (BEV), a Hybrid Electric Vehicle (HEV), a Plug-in Hybrid Electric Vehicle (PHEV), a Fuel Cell Electric Vehicle (FCEV), or the like. The vehicles 10 may be driven by drivers. The driving of each of the vehicles 10 may be partly automated at any level. The level of automation is, for example, one of level 1 to level 5 according to the classification of the Society of Automotive Engineers (SAE). The vehicles 10 may be Mobility as a Service (MaaS) dedicated vehicles.

The terminal apparatus 20 is used by a user. The user operates the terminal apparatus 20 to make a reservation for use of the on-demand bus. When the user wants to cancel the reservation for use of the on-demand bus, the user operates the terminal apparatus 20 to cancel the reservation for use of the on-demand bus.

The terminal apparatus 20 may be any apparatus, which can be connected to the network 2. The terminal apparatus 20 is, for example, a mobile phone, a smartphone, a tablet, a personal computer (PC), or the like.

The information processing apparatus 30 manages reservations for use of the on-demand buses. When a cancellation of a reservation for use of the on-demand bus occurs, the information processing apparatus 30 determines a cancellation fee based on timing of occurrence of the cancellation.

The information processing apparatus 30 may be operated, for example, by an entity providing the on-demand bus service. The information processing apparatus 30 is a dedicated computer configured to function as a server, a general purpose personal computer, a cloud computing system, or the like.

(Configuration of Vehicle)

As illustrated in FIG. 2, the vehicle 10 includes a communication interface 11, a positioner 12, an output interface 13, a memory 14, and a controller 15.

The communication interface 11 is configured to include at least one communication module for connection to the network 2. The communication module is, for example, a communication module compliant with a mobile communication standard such as Long Term Evolution (LTE), 4th Generation (4G), or 5th Generation (5G). However, the communication module is not limited to this. The communication module may be compliant with any communication standard.

The positioner 12 is capable of acquiring positional information on the vehicle 10. The positioner 12 is configured to include at least one receiving module compliant with a satellite positioning system. The receiving module is, for example, a receiving module corresponding to the Global Positioning System (GPS). However, the receiving module is not limited to this. The receiving module may be a receiving module corresponding to any appropriate satellite positioning system.

The output interface 13 can output data. The output interface 13 is configured to include at least one interface for output that is capable of outputting the data. The interface for output is, for example, a display, a speaker, or the like. The display is, for example, a liquid crystal display (LCD), an organic electro-luminescent (EL) display, or the like. However, the interface for output is not limited to this.

The memory 14 is configured to include at least one semiconductor memory, at least one magnetic memory, at least one optical memory, or a combination of at least two of these. The semiconductor memory is, for example, random access memory (RAM), read only memory (ROM), or the like. The RAM is, for example, static random access memory (SRAM), dynamic random access memory (DRAM), or the like. The ROM is, for example, electrically erasable programmable read only memory (EEPROM) or the like. The memory 14 may function as a main memory, an auxiliary memory, or a cache memory. The memory 14 stores data to be used for operations of the vehicle 10 and data obtained by the operations of the vehicle 10.

The controller 15 is configured to include at least one processor, at least one dedicated circuit, or a combination thereof. The processor is, for example, a general purpose processor such as a Central Processing Unit (CPU) or a Graphics Processing Unit (GPU), or a dedicated processor that is dedicated to a specific process. The dedicated circuit is, for example, a Field-Programmable Gate Array (FPGA), an Application Specific Integrated Circuit (ASIC), or the like. The controller 15 executes processes related to the operations of the vehicle 10 while controlling the components of the vehicle 10.

The functions of the vehicle 10 can be realized by execution of a vehicle program according to the present embodiment by the processor corresponding to the controller 15. That is, the functions of the vehicle 10 are realized by software. The vehicle program can cause a computer to function as the vehicle 10 by causing the computer to execute the operations of the vehicle 10. That is, the computer can function as the vehicle 10 by executing the operations of the vehicle 10 in accordance with the vehicle program.

In the present disclosure, a "program" can be recorded on a non-transitory computer readable recording medium. The non-transitory computer readable recording medium is, for example, a magnetic recording device, an optical disc, a magneto-optical recording medium, or ROM. The program is distributed by, for example, selling, transferring, or lending of a portable recording medium such as a Digital Versatile Disc (DVD) or a Compact Disc Read Only Memory (CD-ROM) on which the program is recorded. The program may be stored in a storage of a server. The program stored in the storage of the server may be distributed by being transferred to another computer. The program may be provided as a program product.

In the present disclosure, a "computer" temporarily stores in a main memory, for example, a program recorded on a portable recording medium, or a program transferred from a server. Further, the computer reads the program stored in the main memory using a processor, and executes processes in accordance with the read program using the processor. The computer may read a program directly from the portable recording medium, and execute processes in accordance with the program. The computer may, each time a program is transferred from the server to the computer, sequentially execute processes in accordance with the received program. Without the program being transferred from the server to the computer, the computer may execute processes as a so-called Application Service Provider (ASP)-type service that implements functions only by execution instructions and result acquisitions. Programs encompass information that is to be used for processes by an electronic computer and is thus equivalent to a program. For example, data that is not a direct command to a computer but has a property that regulates processing of the computer is "equivalent to a program" in this context.

Some or all of the functions of the vehicle 10 may be implemented by a dedicated circuit corresponding to the controller 15. That is, some or all of the functions of the vehicle 10 may be realized by hardware.

The controller 15 receives an operation schedule from the information processing apparatus 30 via the network 2, using the communication interface 11. The operation schedule includes, for example, a scheduled route, positional information on a scheduled dispatch spot, a scheduled dispatch time, positional information on a scheduled drop-off spot, and/or a scheduled drop-off time, as described later. However, the operation schedule is not limited to this. The operation schedule may include any information to be used for operating the vehicle 10. The controller 15 stores the received operation schedule in the memory 14. When the controller 15 receives a new operation schedule, the controller 15 may update the operation schedule stored in the memory 14 with the new operation schedule.

The controller 15 controls the vehicle 10 to travel according to the operation schedule stored in the memory 14. As an example, when the vehicle is driven by a driver, the controller 15 presents the operation schedule to the driver by controlling the output interface 13 to output the operation schedule. By presenting the operation schedule to the driver, the controller 15 encourages the driver to drive the vehicle 10 in accordance with the operation schedule. As another example, when the operations of the vehicle 10 are automated, the controller 15 commands an autonomous driving system of the vehicle 10 to operate the vehicle 10 in accordance with the operation schedule.

While the vehicle 10 is travelling, the controller 15 acquires positional information on the vehicle 10 using the positioner 12. The controller 15 transmits, through the communication interface 11, the acquired positional information on the vehicle 10 to the information processing apparatus 30 via the network 2. The controller 15 may acquire, at any time intervals, the positional information on the vehicle 10 and transmit the acquired positional information on the vehicle 10 to the information processing apparatus 30. The time intervals may be set as appropriate based on the speed of the vehicle 10 or the like.

(Configuration of Terminal Apparatus)

As illustrated in FIG. 2, the terminal apparatus 20 includes a communication interface 21, an input interface 22, an output interface 23, a memory 24, and a controller 25.

The communication interface 21 is configured to include at least one communication module for connection to the network 2. The communication module is, for example, a communication module compliant with a mobile communication standard such as LTE, 4G, or 5G. However, the communication module is not limited to this. The communication module may be compliant with any communication standard.

The input interface 22 is capable of accepting an input from a user. The input interface 22 is configured to include at least one interface for input that is capable of accepting the input from the user. The interface for input is, for example, a physical key, a capacitive key, a pointing device, a touch screen integrally provided with a display, a microphone, or the like. However, the interface for input is not limited to this.

The output interface 23 can output data. The output interface 23 is configured to include at least one interface for output that is capable of outputting the data. The interface for output is, for example, a display, a speaker, or the like. The display is, for example, an LCD, an organic EL display, or the like. However, the interface for output is not limited to this.

The memory 24 is configured to include at least one semiconductor memory, at least one magnetic memory, at least one optical memory, or a combination of at least two of these. The semiconductor memory is, for example, RAM, ROM, or the like. The RAM is, for example, SRAM, DRAM, or the like. The ROM is, for example, EEPROM or the like. The memory 24 may function as a main memory, an auxiliary memory, or a cache memory. The memory 24 stores data to be used for operations of the terminal apparatus 20 and data obtained by the operations of the terminal apparatus 20.

The controller 25 is configured to include at least one processor, at least one dedicated circuit, or a combination thereof. The processor is, for example, a general purpose processor such as a CPU or a GPU, or a dedicated processor that is dedicated to a specific process. The dedicated circuit is, for example, an FPGA, an ASIC, or the like. The controller 25 executes processes related to operations of the terminal apparatus 20 while controlling the components of the terminal apparatus 20.

The functions of the terminal apparatus 20 are realized by execution of a terminal program according to the present embodiment by the processor corresponding to the controller 25. That is, the functions of the terminal apparatus 20 are realized by software. The terminal program causes a computer to execute the operations of the terminal apparatus 20, thereby causing the computer to function as the terminal apparatus 20. That is, the computer executes the operations of the terminal apparatus 20 in accordance with the terminal program to thereby function as the terminal apparatus 20.

Some or all of the functions of the terminal apparatus 20 may be implemented by a dedicated circuit corresponding to the controller 25. That is, some or all of the functions of the terminal apparatus 20 may be realized by hardware.

The controller 25 accepts, through the input interface 22, an input of an application for a reservation for use of the on-demand bus. The input of the application is entered from the input interface 22 by the user who wants to reserve and use the on-demand bus. For example, the user enters the input of the application from the input interface 22 days or hours before the date and time the user wants to use the on-demand bus. Along with the input of the application, the controller 25 may accept, through the input interface 22, an input of the user's desired conditions in use of the on-demand bus. The desired conditions may include a desired date, a desired dispatch spot, a desired dispatch time, a desired drop-off spot, a desired drop-off time, and/or a desired number of passengers. The desired date is a date on which the user wants to use the on-demand bus. The desired dispatch spot is a spot to which the user wants the on-demand bus to be dispatched. The desired dispatch time is a time at which the user wants the on-demand bus to be dispatched. The desired drop-off spot is a spot at which the user wants to get off the on-demand bus. The desired drop-off time is a time at which the user wants to get off the on-demand bus. The desired number of passengers is the number of people the user wants the on-demand bus to accommodate. When the user wants to ride on the on-demand bus alone, the desired number of passengers is one. Upon receiving the input through the input interface 22, the controller 25 generates application information indicating the application for the reservation for use of the on-demand bus. The application information includes, for example, the user's identification information and desired conditions. The controller 25 transmits, through the communication interface 21, the generated application information to the information processing apparatus 30 via the network 2.

After transmitting the application information, the controller 25 can receive, through the communication interface 21, a reservation completion notice and reservation information from the information processing apparatus via the network 2. The reservation completion notice is a notice indicating that the reservation for use of the on-demand bus has been completed. The reservation information includes, for example, a scheduled date, a scheduled dispatch spot, a scheduled dispatch time, a scheduled drop-off spot, a scheduled drop-off time, a scheduled number of passengers, and/or a scheduled route. The scheduled date is a date on which the user is scheduled to use the on-demand bus. The scheduled dispatch spot is a spot to which the on-demand bus is scheduled to be dispatched. The scheduled dispatch time is a time at which the on-demand bus is scheduled to be dispatched. The scheduled drop-off spot is a spot at which the user is scheduled to get off the on-demand bus. The scheduled drop-off time is a time at which the user is scheduled to get off the on-demand bus. The scheduled number of passengers is the number of people who are scheduled to ride on the on-demand bus. When the user is scheduled to ride on the on-demand bus alone, the scheduled number of passengers is one. The scheduled route is a route along which the on-demand bus is scheduled to travel from the scheduled dispatch spot to the scheduled drop-off spot. The controller 25 controls the output interface 23 to output the reservation completion notice and the reservation information. The output interface 23 outputs the reservation completion notice and the like, so that the user can know that the reservation for use of the on-demand bus has been completed.

<Cancellation Process>

The controller 25 accepts, through the input interface 22, an input of a cancellation of the reservation for use of the on-demand bus. The input of the cancellation is entered from the input interface 22 by the user who wants to cancel the reservation for use of the on-demand bus. Upon receiving the input of the cancellation by the input interface 22, the controller 25 transmits, through the communication interface 21, a cancellation notice indicating the cancellation of the reservation for use of the on-demand bus to the information processing apparatus 30 via the network 2.

After transmitting the cancellation notice, the controller 25 receives, through the communication interface 21, information on a cancellation fee from the information processing apparatus 30 via the network 2. The controller controls the output interface 23 to output the information on the cancellation fee. The information on the cancellation fee is output from the output interface 23, so that the user can know the cancellation fee.

<Presentation Process>

The above-described application for the reservation for use of the on-demand bus and cancellation of the reservation for use of the on-demand bus may be executed via a web-based input form. In this case, in the cancellation process, the controller 25 accepts, through the input interface 22, an input requesting presentation of the input form that enables to input the cancellation of the reservation for use of the on-demand bus. Upon receiving the input by the input interface 22, the controller 25 controls the communication interface 21 to transmit a request signal to the information processing apparatus 30 via the network 2. The request signal is a signal requesting presentation of the input form that enables to input the cancellation of the reservation for use of the on-demand bus.

After transmitting the request signal, the controller 25 receives, through the communication interface 21, information on a cancellation fee for making the cancellation at present, from the information processing apparatus via the network 2. The controller 25 controls the output interface 23 to output the received information on the cancellation fee for making the cancellation at present. The information on the cancellation fee for making the cancellation at present is output from the output interface 23, so that the user can consider whether to cancel the reservation for use of the on-demand bus, taking into account the cancellation fee.

(Configuration of Information Processing Apparatus)

As illustrated in FIG. 2, the information processing apparatus 30 includes a communication interface 31, a memory 32, and a controller 33.

The communication interface 31 is configured to include at least one communication module for connection to the network 2. The communication module is, for example, a communication module compliant with a standard such as a wired Local Area Network (LAN) standard or a wireless LAN standard. However, the communication module is not limited to this. The communication module may be compliant with any communication standard. The communication interface 31 is connectable to the network 2 via a wired LAN or a wireless LAN using the communication module.

The memory 32 is configured to include at least one semiconductor memory, at least one magnetic memory, at least one optical memory, or a combination of at least two of these. The semiconductor memory is, for example, RAM, ROM, or the like. The RAM is, for example, SRAM, DRAM, or the like. The ROM is, for example, EEPROM or the like. The memory 32 may function as a main memory, an auxiliary memory, a cache memory, or the like. The memory 32 stores data to be used for operations of the information processing apparatus 30 and data obtained by the operations of the information processing apparatus 30.

The controller 33 is configured to include at least one processor, at least one dedicated circuit, or a combination thereof. The processor is, for example, a general purpose processor such as a CPU or a GPU, or a dedicated processor that is dedicated to a specific process. The dedicated circuit is, for example, an FPGA, an ASIC, or the like. The controller 33 executes processes related to the operations of the information processing apparatus 30 while controlling the components of the information processing apparatus 30.

The functions of the information processing apparatus 30 are implemented by executing a processing program according to the present embodiment by the processor corresponding to the controller 33. That is, the functions of the information processing apparatus 30 may be implemented by software. The processing program enables a computer to function as the information processing apparatus 30 by causing the computer to execute the operations of the information processing apparatus 30. That is, the computer functions as the information processing apparatus 30, by executing the operations of the information processing apparatus 30 in accordance with the processing program.

Some or all of the functions of the information processing apparatus 30 may be realized by a dedicated circuit corresponding to the controller 33. That is, some or all of the functions of the information processing apparatus 30 may be realized by hardware.

The controller 33 receives, through the communication interface 31, application information from the terminal apparatus 20 via the network 2. Upon receiving the application information, the controller 33 performs a reservation process for the on-demand bus.

<Reservation Process>

The controller 33 extracts, out of the plurality of vehicles 10, a vehicle that satisfies the user's desired conditions included in the received application information. When there is no vehicle 10 that satisfies the user's desired conditions, the controller 33 may transmit, through the communication interface 31, suggestion information suggesting to the user that the user change the desired conditions, to the terminal apparatus 20 via the network 2. In this case, in the external apparatus 20, the controller 25 receives, through the communication interface 21, the suggestion information from the information processing apparatus 30 via the network 2. The controller 25 controls the output interface 23 to output the the suggestion information. When the user looks at the suggestion information output from the output interface 23, the user inputs changed desired conditions from the input interface 22. The controller 25 transmits, through the communication interface 21, information on the changed desired conditions to the information processing apparatus 30 via the network 2. In the information processing apparatus 30, the controller 33 receives, through the communication interface 31, the information on the changed desired conditions from the terminal apparatus 20 via the network 2. The controller 33 extracts, out of the plurality of vehicles 10, a vehicle 10 that satisfies the changed desired conditions.

Upon extracting the vehicle 10 that satisfies the user's desired conditions, the controller 33 changes an operation schedule of the extracted vehicle 10 so as to satisfy the user's desired conditions. The controller 33 transmits, through the communication interface 31, the changed operation schedule to the extracted vehicle 10 via the network 2. The controller 33 also generates reservation information. The controller 33 transmits, through the communication interface 31, a reservation completion notice and the reservation information to the terminal apparatus 20 via the network 2.

<Cancellation Process>

The controller 33 receives, through the communication interface 31, a cancellation notice from the terminal apparatus 20 via the network 2. Upon receiving the cancellation notice, the controller 33 determines that a cancellation of the reservation for use of the on-demand bus occurs.

When the cancellation of the reservation for use of the on-demand bus occurs, the controller 33 identifies the vehicle 10 on which the user has been scheduled to ride, from among the plurality of vehicles 10. The controller 33 changes the operation schedule of the identified vehicle 10 based on the cancellation notice. The controller 33 transmits, through the communication interface 31, the changed operation schedule to the identified vehicle 10 via the network 2.

When the cancellation of the reservation for use of the on-demand bus occurs, the controller 33 determines a cancellation fee to be charged to a user who makes the cancellation, based on timing of occurrence of the cancellation. The cancellation fee to be determined is a cancellation fee per person. However, the cancellation fee to be determined is not limited to the cancellation fee per person. The controller 33 may recognize timing at which the cancellation notice is received from the terminal apparatus 20 as timing at which the cancellation occurs. For example, the user sometimes changes the details of the reservation for use of the on-demand bus before cancelling the reservation for use of the on-demand bus. By determining the cancellation fee based on the timing of occurrence of the cancellation, the user can be charged with the appropriate cancellation fee. The controller 33 transmits, through the communication interface 31, information on the determined cancellation fee to the terminal apparatus 20 via the network 2.

The controller 33 may determine the cancellation fee based on the timing of occurrence of the cancellation, while ensuring that the cancellation fee does not exceed an upper limit amount of a fare for the on-demand bus. By ensuring that the cancellation fee does not exceed the upper limit amount of the fare for the on-demand bus, it is possible to prevent the cancellation fee from being unreasonably high.

Examples of a cancellation fee determination process will be hereinafter described.

Example 1

The controller 33 may determine the cancellation fee based on whether a scheduled fellow passenger who is scheduled to ride with the user on the on-demand bus is present at the timing of occurrence of the cancellation.

The controller 33 may determine a lower cancellation fee when the scheduled fellow passenger who is scheduled to ride with the user on the on-demand bus is present at the timing of occurrence of the cancellation than when no scheduled fellow passenger is present. In other words, the cancellation fee may be lower when the scheduled fellow passenger is present at the timing of occurrence of the cancellation than when no scheduled fellow passenger is present. The controller 33 may determine that the scheduled fellow passenger is present when the number of scheduled passengers included in the reservation information, at the timing of occurrence of the cancellation, is two or more. The controller 33 may determine that no scheduled fellow passenger is present when the number of scheduled passengers included in the reservation information, at the timing of occurrence of the cancellation, is one.

Lowering the cancellation fee per person when the scheduled fellow passenger is present can reduce the user's burden. Here, to operate the on-demand bus, fuel and other costs are required. The costs can be compensated by the cancellation fee when the reservation for use of the on-demand bus is cancelled. When the scheduled fellow passenger is present, the number of people who pay the cancellation fee increases. Therefore, when the scheduled fellow passenger is present, even though the cancellation fee per person is lowered, the total amount of the cancellation fee can be almost the same whether or not the scheduled fellow passenger is present. In other words, when the scheduled fellow passenger is present, even though the cancellation fee per person is lowered, it is possible to compensate for the costs of operating the on-demand bus in the same way as when no scheduled fellow passenger is present.

In a case in which one or more scheduled fellow passengers are present at the timing of occurrence of the cancellation, the controller 33 may determine a lower cancellation fee the greater the number of the scheduled fellow passengers. In other words, the greater the number of the scheduled fellow passengers, the lower the cancellation fee may be. Lowering the cancellation fee per person the greater the number of the scheduled fellow passengers can further reduce the user's burden. In addition, the greater the number of the scheduled fellow passengers, the greater the number of people who pay the cancellation fee. Therefore, even in a case in which the cancellation fee per person is lowered, the greater the number of the scheduled fellow passengers, the total amount of the cancellation fee can be almost the same as in a case in which, for example, no scheduled fellow passenger is present. In other words, even in a case in which the cancellation fee per person is lowered, the greater the number of the scheduled fellow passengers, it is possible to compensate for the costs of operating the on-demand bus in the same way as in a case in which no scheduled fellow passenger is present.

Example 2

The controller 33 may determine a higher cancellation fee when the on-demand bus deviates from the basic route to head for the scheduled dispatch spot at the timing of occurrence of the cancellation than when the on-demand bus does not deviate from the basic route. In other words, the cancellation fee may be higher when the on-demand bus deviates from the basic route to head for the scheduled dispatch spot at the timing of occurrence of the cancellation than when the on-demand bus does not deviate from the basic route. The controller 33 receives, through the communication interface 31, the positional information on the vehicle 10 from the vehicle 10 via the network 2. The controller 33 may determine, from the received positional information on the vehicle 10 and the basic route, whether the on-demand bus deviates from the basic route.

When the reservation for use of the on-demand bus is cancelled after the on-demand bus has deviated from the basic route, the on-demand bus is required to return to the basic route. When the on-demand bus deviates from the basic route and then returns to the basic route, additional fuel and other costs are incurred, resulting in additional costs to operate the on-demand bus. By raising the cancellation fee when the on-demand bus deviates from the basic route to head for the scheduled dispatch spot, the cancellation fee can compensate for the additional costs. In addition, by raising the cancellation fee when the on-demand bus deviates from the basic route to head for the scheduled dispatch spot, the user can be encouraged to cancel the reservation for use of the on-demand bus at earlier timing.

When the on-demand bus deviates from the basic route to head for the scheduled dispatch spot at the timing of occurrence of the cancellation, the controller 33 may determine the cancellation fee based on the degree of deviation from the basic route. The degree of deviation from the basic route may be distance the on-demand bus has traveled since the on-demand bus deviated from the basic route, or time elapsed since the on-demand bus deviated from the basic route. As described above, when the on-demand bus deviates from the basic route and then returns to the basic route, additional costs associated with operating the on-demand bus are incurred. By determining the cancellation fee based on the degree of deviation from the basic route, the cancellation fee can more reliably compensate for the additional costs.

The controller 33 may determine a higher cancellation fee, the greater the degree to which the on-demand bus deviates from the basic route. In other words, the greater the degree to which the on-demand bus deviates from the basic route, the higher the cancellation fee may be. The additional costs to be incurred to return the on-demand bus to the basic route increases with the degree of deviation of the on-demand bus from the basic route. By raising the cancellation fee with the degree of deviation of the on-demand bus from the basic route, the cancellation fee can more reliably compensate for the additional costs.

Example 3

The controller 33 may determine a higher cancellation fee when the scheduled dispatch time or scheduled drop-off time at the timing of occurrence of the cancellation is within a set time period than when the scheduled dispatch time or scheduled drop-off time is not within the set time period. In other words, the cancellation fee may be higher when the scheduled dispatch time or scheduled drop-off time at the timing of occurrence of the cancellation is within the set time period than when the scheduled dispatch time or scheduled drop-off time is not within the set time period. The set time period may be set based on, for example, a time period during which demand for the on-demand buses is high.

As an example, the set time period may be a time period during which the number of reservations for the on-demand buses is equal to or greater than a threshold value. The number of reservations for the on-demand buses may be the number of reservations per hour on the day the on-demand bus is scheduled to be used. The threshold value may be set based on, for example, the number of seats on the on-demand bus. The demand for the on-demand buses is high at a time period during which the number of reservations for the on-demand buses is equal to or greater than the threshold value.

As another example, the set time period may be set based on a commute time period. In this case, the set time period may be a time period that includes at least part of the commute time period. The demand for the on-demand buses is high in the commute time period. Assuming that some of the plurality of vehicles 10 are operated as the regular route buses as described above during the commute time period, the number of on-demand buses is smaller in the commute time period than in other time periods of the day. Therefore, the demand for the on-demand buses is higher.

It may be more difficult to make a reservation for use of the on-demand bus at a time period during which the demand for the on-demand buses is high than at the other time periods of the day. By raising the cancellation fee when the scheduled dispatch time or the like of the user is included in the set time period, a possibility that the user cancels the reservation for use of the on-demand bus at the set time period is reduced.

Example 4

The controller 33 may determine a lower cancellation fee, the earlier the timing of occurrence of the cancellation. In other words, the earlier the timing of occurrence of the cancellation, the lower the cancellation fee may be. By lowering the cancellation fee, the earlier the timing of occurrence of the cancellation, the user can be encouraged to cancel the reservation for use of the on-demand bus at earlier timing. When the reservation for use of the on-demand bus is cancelled at earlier timing, another user can make a reservation for use of the on-demand bus.

<Presentation Process>

The above-described application for the reservation for use of the on-demand bus and the cancellation of the reservation for use of the on-demand bus may be executed via the web-based input form. In this case, the controller 33 receives, through the communication interface 31, the request signal described above from the terminal apparatus 20 via the network 2. The controller 33 determines the cancellation fee, as described above, by recognizing timing at which the request signal is received as timing at which the cancellation of the reservation for use of the on-demand bus occurs. The controller 33 transmits, through the communication interface 31, information on the determined cancellation fee to the terminal apparatus 20 via the network 2, as information on the cancellation fee for making the cancellation at present. Instead of transmitting the information on the determined cancellation fee to the terminal apparatus 20, the controller 33 may present the information on the determined cancellation fee in the web-based input form, as the information on the cancellation fee for making the cancellation at present.

(Operations of System)

FIG. 3 is a sequence diagram illustrating operations for the reservation process by the information processing system 1 illustrated in FIG. 1. The operations correspond to an example of an information processing method according to the present embodiment. For example, when the terminal apparatus 20 receives, from a user, an input of an application for a reservation for use of an on-demand bus and the like, the information processing system 1 performs processes from step S1.

In the terminal apparatus 20, the controller 25 generates application information indicating the application for the reservation for use of the on-demand bus (step S1). The controller 25 transmits, through the communication interface 21, the application information generated in the process of step S1 to the information processing apparatus 30 via the network 2 (step S2).

In the information processing apparatus 30, the controller 33 receives, through the communication interface 31, the application information from the terminal apparatus 20 via the network 2 (step S3). Upon receiving the application information in the process of step S3, the controller 33 extracts a vehicle 10 that satisfies the user's desired conditions included in the application information from among the plurality of vehicles 10. The controller 33 changes an operation schedule of the extracted vehicle 10 so as to satisfy the user's desired conditions (step S4). The controller 33 transmits, through the communication interface 31, the changed operation schedule to the vehicle 10 via the network 2 (step S5). In the vehicle 10, the controller 15 receives, through the communication interface 11, the changed operation schedule from the information processing apparatus 30 via the network 2 (step S6).

In the information processing apparatus 30, after performing the process of step S4, the controller 33 generates reservation information (step S7). The controller 33 transmits, through the communication interface 31, a reservation completion notice and the reservation information to the terminal apparatus 20 via the network 2 (step S8). In the terminal apparatus 20, the controller 25 receives, through the communication interface 21, the reservation completion notice and the reservation information from the information processing apparatus 30 via the network 2 (step S9).

FIG. 4 is a sequence diagram illustrating operations for the cancellation process by the information processing system 1 illustrated in FIG. 1. The operations correspond to an example of the information processing method according to the present embodiment. For example, when the terminal apparatus 20 receives, from the user, an input of a cancellation for the reservation for use of the on-demand bus, the information processing system 1 starts processes from step S11.

In the terminal apparatus 20, the controller 25 transmits, through the communication interface 21, a cancellation notice to the information processing apparatus 30 via the network 2 (step S11). In the information processing apparatus 30, the controller 33 receives, through the communication interface 31, the cancellation notice from the terminal apparatus 20 via the network 2 (step S12).

In the information processing apparatus 30, upon receiving the cancellation notice by the process of step S12, the controller 33 changes the operation schedule of the vehicle 10 on which the user is scheduled to ride, based on the cancellation notice (step S13). The controller 33 transmits, through the communication interface 31, the changed operation schedule to the vehicle 10 via the network 2 (step S14). In the vehicle 10, the controller 15 receives, through the communication interface 11, the changed operation schedule from the information processing apparatus 30 via the network 2 (Step S15).

In the information processing apparatus 30, upon receiving the cancellation notice by the process of step S12, the controller 33 determines a cancellation fee based on timing of occurrence of the cancellation (step S16). The controller 33 transmits, through the communication interface 31, information on the determined cancellation fee to the terminal apparatus 20 via the network 2 (step S17). In the terminal apparatus 20, the controller 25 receives, through the communication interface 21, the information on the cancellation fee from the information processing apparatus 30 via the network 2 (step S18).

Thus, in the information processing apparatus 30, when the cancellation of the reservation for use of the on-demand bus occurs, the controller 33 determines the cancellation fee to be charged to the user who makes the cancellation, based on the timing of occurrence of the cancellation. For example, the user sometimes changes the details of the reservation for use of the on-demand bus before cancelling the reservation for use of the on-demand bus. By determining the cancellation fee based on the timing of occurrence of the cancellation, the user can be charged with the appropriate cancellation fee. Therefore, the present embodiment can provide technology for determining appropriate cancellation fees.

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each component, each step, or the like can be rearranged without logical inconsistency, and a plurality of components, steps, or the like can be combined into one or divided.

For example, an embodiment in which a general purpose computer functions as the information processing apparatus 30 according to the above embodiment can also be implemented. Specifically, a program in which processes for realizing the functions of the information processing apparatus according to the above embodiment are written may be stored in a memory of a general purpose computer, and the program may be read and executed by a processor. Accordingly, the present disclosure can also be implemented as a program executable by a processor, or a non-transitory computer readable medium storing the program.

The invention claimed is:

1. An information processing apparatus comprising a controller configured to:
    receive a reservation request comprising one or more conditions;
    determine a vehicle capable of satisfying the one or more conditions;
    change an operation schedule of the determined vehicle to satisfy the one or more conditions, the operation schedule includes a scheduled route of travel of the determined vehicle;
    determine, when a cancellation of a reservation for use of an on-demand bus occurs, a cancellation fee to be charged to a user who makes the cancellation, based on timing of occurrence of the cancellation;
    determine a first cancellation fee when a scheduled fellow passenger who is scheduled to ride with the user on the on-demand bus is present at the timing of occurrence of the cancellation that is lower than a second cancellation fee determined when no scheduled fellow passenger is present;
    when one or more scheduled fellow passengers are present at the timing of occurrence of the cancellation, determine a third cancellation fee that is lower than a fourth cancellation fee determined when a smaller number of the scheduled fellow passengers are present; and
    control an autonomous driving system of the determined vehicle to operate the determined vehicle in accordance with the changed operation schedule.

2. The information processing apparatus according to claim 1, wherein the on-demand bus travels on a predetermined basic route, and the controller determines a higher cancellation fee when the on-demand bus deviates from the basic route to head for a scheduled dispatch spot at the timing of occurrence of the cancellation than when the on-demand bus does not deviate from the basic route.

3. The information processing apparatus according to claim 1, wherein
the on-demand bus travels on a predetermined basic route, and
when the on-demand bus deviates from the basic route to head for a scheduled dispatch spot at the timing of occurrence of the cancellation, the controller determines the cancellation fee based on a degree to which the on-demand bus deviates from the basic route.

4. The information processing apparatus according to claim 3, wherein the degree to which the on-demand bus deviates from the basic route is distance the on-demand bus has traveled since the on-demand bus deviated from the basic route.

5. The information processing apparatus according to claim 3, wherein the degree to which the on-demand bus deviates from the basic route is time elapsed since the on-demand bus deviated from the basic route.

6. The information processing apparatus according to claim 3, wherein the controller determines a higher cancellation fee, the greater the degree to which the on-demand bus deviates from the basic route.

7. The information processing apparatus according to claim 1, wherein the controller determines a higher cancellation fee when a scheduled dispatch time or a scheduled drop-off time at the timing of occurrence of the cancellation is within a set time period than when the scheduled dispatch time or the scheduled drop-off time is not within the set time period.

8. The information processing apparatus according to claim 7, wherein the set time period is a time period during which a number of reservations for the on-demand bus is equal to or greater than a threshold value.

9. The information processing apparatus according to claim 7, wherein the set time period is set based on a commute time period.

10. The information processing apparatus according to claim 1, wherein the controller determines a lower cancellation fee, the earlier the timing of occurrence of the cancellation.

11. The information processing apparatus according to claim 1, wherein the controller determines the cancellation fee based on the timing of occurrence of the cancellation, while ensuring that the cancellation fee does not exceed an upper limit amount of a fare for the on-demand bus.

12. The information processing apparatus according to claim 1, further comprising a communication interface,
wherein the controller is configured to:
upon receiving, through the communication interface, a request signal requesting presentation of an input form enabling to input the cancellation from a terminal apparatus of a user who has made the reservation for use, determine the cancellation fee by recognizing timing at which the request signal is received as timing at which the cancellation of the reservation for use occurs; and
control the communication interface to transmit information on the determined cancellation fee to the terminal apparatus, as information on the cancellation fee for making the cancellation at present.

13. The information processing apparatus according to claim 1, further comprising a communication interface,
wherein the controller is configured to control the communication interface to transmit information on the determined cancellation fee to a terminal apparatus of a user who has made the reservation for use.

14. The information processing apparatus according to claim 1, further comprising a communication interface,
wherein the controller is configured to recognize timing at which the communication interface receives a cancellation notice indicating the cancellation of the reservation for use from a terminal apparatus of a user who has made the reservation for use, as timing at which the cancellation of the reservation for use occurs.

15. The information processing apparatus according to claim 1, further comprising a communication interface,
wherein the controller is configured to perform a reservation process for the on-demand bus, upon receiving, through the communication interface, application information indicating an application for the reservation for use of the on-demand bus from a terminal apparatus.

16. An information processing system comprising:
a terminal apparatus configured to transmit, to an information processing apparatus, application information indicating an application for a reservation for use of an on-demand bus and one or more conditions;
the information processing apparatus configured to, upon receiving the application information, perform a reservation process for the on-demand bus by determining a vehicle capable of satisfying the one or more conditions, and changing an operation schedule of the determined vehicle to satisfy the one or more conditions; and
a controller to control an autonomous driving system of the determined vehicle to operate the determined vehicle in accordance with the changed operation schedule,
wherein when a cancellation of the reservation for use of the on-demand bus occurs, the information processing apparatus determines a cancellation fee to be charged to a user who makes the cancellation, based on timing of occurrence of the cancellation;
wherein the information processing apparatus determines a first cancellation fee when a scheduled fellow passenger who is scheduled to ride with the user on the on-demand bus is present at the timing of occurrence of the cancellation that is lower than a second cancellation fee determined when no scheduled fellow passenger is present; and
wherein when one or more scheduled fellow passengers are present at the timing of occurrence of the cancellation, the information processing apparatus determines a third cancellation fee that is lower than a fourth cancellation fee determined when a smaller number of the scheduled fellow passengers are present.

17. The information processing system according to claim 16, wherein
the information processing apparatus is configured to:
upon receiving, a request signal requesting presentation of an input form enabling to input the cancellation from the terminal apparatus, determine the cancellation fee by recognizing timing at which the request signal is received as timing at which the cancellation of the reservation for use occurs; and
transmit information on the determined cancellation fee to the terminal apparatus, as information on the cancellation fee for making the cancellation at present, and the terminal apparatus is configured to control an output interface of the terminal apparatus to output the information on the cancellation fee for making the cancellation at present.

18. An information processing method comprising:

receiving a reservation request comprising one or more conditions;

determining a vehicle capable of satisfying the one or more conditions;

changing an operation schedule of the determined vehicle to satisfy the one or more conditions, the operation schedule includes a scheduled route of travel of the determined vehicle;

determining, when a cancellation of a reservation for use of an on-demand bus occurs, a cancellation fee to be charged to a user who makes the cancellation based on timing of occurrence of the cancellation;

determining a first cancellation fee when a scheduled fellow passenger who is scheduled to ride with the user on the on-demand bus is present at the timing of occurrence of the cancellation that is lower than a second cancellation fee determined when no scheduled fellow passenger is present;

when one or more scheduled fellow passengers are present at the timing of occurrence of the cancellation, determine a third cancellation fee that is lower than a fourth cancellation fee determined when a smaller number of the scheduled fellow passengers are present; and controlling an autonomous driving system of the determined vehicle to operate the determined vehicle in accordance with the changed operation schedule.

* * * * *